(12) United States Patent  
Munger et al.

(10) Patent No.: US 12,183,199 B2  
(45) Date of Patent: Dec. 31, 2024

(54) SYSTEM AND METHOD FOR MANAGEMENT OF PARKING SPACES

(71) Applicant: Street Spot Me LLC, New York, NY (US)

(72) Inventors: Christopher Munger, New York, NY (US); Roy McDonald, Byram Township, NJ (US)

(73) Assignee: STREET SPOT ME, LLC, New York, NY (US)

( * ) Notice: Subject to any disclaimer, the term of this patent is extended or adjusted under 35 U.S.C. 154(b) by 0 days.

(21) Appl. No.: 17/401,626

(22) Filed: Aug. 13, 2021

(65) Prior Publication Data

US 2021/0375137 A1 Dec. 2, 2021

Related U.S. Application Data

(63) Continuation of application No. 17/082,923, filed on Oct. 28, 2020, now abandoned.

(Continued)

(51) Int. Cl.
*H04W 76/25* (2018.01)
*G01C 21/00* (2006.01)
(Continued)

(52) U.S. Cl.
CPC .......... *G08G 1/144* (2013.01); *G01C 21/3807* (2020.08); *G01C 21/3859* (2020.08);
(Continued)

(58) Field of Classification Search
CPC .......... G08G 1/144; G08G 1/141; G08G 1/00; G08G 1/14; G08G 1/143; G08G 1/146; G08G 1/149; H04W 76/25; H04W 76/10; H04W 4/023; G06N 20/00; G06F 16/9537; G06F 16/29; G01C 21/3859; G01C 21/3807; G01C 21/3685; G01C 21/26; G01C 21/34; G01C 21/36; G01C 21/3679; G01C 21/3461; G06Q 30/0205; G06Q 10/02; G06Q 20/36; G06Q 30/0284;
(Continued)

(56) References Cited

U.S. PATENT DOCUMENTS 10,373,266 B2 * 8/2019 Marlowe .............. G06Q 10/087
10,585,431 B2 * 3/2020 Golgiri ................ G05D 1/0011
(Continued)

FOREIGN PATENT DOCUMENTS

WO WO-2017221022 A1 * 12/2017

*Primary Examiner* — James J Yang
*Assistant Examiner* — Anthony D Afrifa-Kyei
(74) *Attorney, Agent, or Firm* — The Concept Law Group, PA; Scott D. Smiley; Scott M. Garrett (57) ABSTRACT

A system and method for management of parking spaces is provided. The system including a server configured to receive the geolocation of a motorist and generate a live interactive map depicting available parking spaces configured to be occupied by the motorist either immediately or within an upcoming period of time. The server further configured to establish a secure connection between computing devices associated with the motorist and a current occupier of an applicable parking space allowing an opportunity for the occupier to preserve the applicable parking space until arrival of the motorist at the applicable parking space.

16 Claims, 8 Drawing Sheets

Related U.S. Application Data (60) Provisional application No. 62/926,763, filed on Oct. 28, 2019.

(51) Int. Cl.
| | |
|---|---|
| *G06F 16/29* | (2019.01) |
| *G06F 16/9537* | (2019.01) |
| *G06N 20/00* | (2019.01) |
| *G06Q 30/0204* | (2023.01) |
| *G08G 1/14* | (2006.01) |
| *H04W 4/02* | (2018.01) |
| *H04W 76/10* | (2018.01) |
| *G06Q 10/02* | (2012.01) |
| *G06Q 20/36* | (2012.01) |
| *G06Q 30/0283* | (2023.01) |

(52) U.S. Cl.
CPC .......... *G06F 16/29* (2019.01); *G06F 16/9537* (2019.01); *G06N 20/00* (2019.01); *G06Q 30/0205* (2013.01); *H04W 4/023* (2013.01); *H04W 76/10* (2018.02); *H04W 76/25* (2018.02); *G06Q 10/02* (2013.01); *G06Q 20/36* (2013.01); *G06Q 30/0284* (2013.01)

(58) Field of Classification Search
CPC .. G06Q 20/127; G06Q 20/3224; G06Q 10/00; G06Q 30/0283; G07C 1/30; G07F 17/246; G07B 15/02; G07B 15/00; G05D 1/0088; G05D 1/0225; G05D 1/0242; G05D 1/0255; G05D 1/0285
See application file for complete search history.

(56) References Cited

U.S. PATENT DOCUMENTS

| | | | |
|---|---|---|---|
| 2010/0302068 A1* | 12/2010 | Bandukwala | H04W 4/46 340/932.2 |
| 2016/0253748 A1* | 9/2016 | Levy | G08G 1/205 705/13 |
| 2017/0190318 A1* | 7/2017 | Imamura | B60R 25/241 |
| 2017/0200320 A1* | 7/2017 | Tomer | G07B 15/00 |
| 2018/0053237 A1* | 2/2018 | Hayes | H04W 4/025 |
| 2018/0313661 A1* | 11/2018 | Eyster | G08G 1/144 |
| 2019/0082047 A1* | 3/2019 | Abramson | H04W 4/027 |

* cited by examiner

SYSTEM AND METHOD FOR MANAGEMENT OF PARKING SPACES

CROSS-REFERENCE TO RELATED APPLICATIONS

This application is a continuation of U.S. application Ser. No. 17/082,923, titled "System and Method for Management of Parking Spaces," and filed on Oct. 28, 2020, which claims priority to U.S. Provisional Patent Application Ser. No. 62/926,763 filed Oct. 28, 2019, and claims the benefit of that application, the entirety of which is hereby incorporated by reference.

FIELD OF THE INVENTION

The present invention relates generally to vehicle parking over a communication network, and, more particularly, relates to a system and method for management of parking spaces for vehicles.

BACKGROUND OF THE INVENTION

Parking and the act of searching for available parking spaces is objectively considered an exasperating task, especially when taking into consideration significant factors such as traffic volume, population density, and other factors of various cities and boroughs. In particular, motorists who drive in congested areas such as a downtown section of a major metropolitan area must account for the additional time and resources required to find and secure parking within the area beforehand in order to efficiently commute in and out of the city. Furthermore, designations and privileges (or lack thereof) of parking spaces is considered a convoluted matter in which it is common for motorist to receive parking tickets and fines due to misinterpretation of parking spaces, their allocated time of availability to the public, and/or their applicable classification.

Systems and mechanism have been implemented in order to provide motorists with designated parking spaces that are assigned to specific motorists at a specific time. However, depending on the applicable major metropolitan area, these systems and mechanism can be rather costly. For example, according to the New York Times, the average yearly cost for a parking space in New York City is roughly $165,019. In addition, some parking systems include mechanisms configured to provide real time data relating to parking availability in an applicable parking lot/garage. However, not only do these systems require expensive infrastructures to install applicable components, such as sensors and communicative devices, but also these systems fail to provide mechanisms that ensure that the motorist is obtaining the optimal parking spot.

Therefore, there exists a need for a system and method for managing parking spaces for vehicles that does not fall victim to the aforementioned in order to allow motorists to eliminate common issues associated with vehicle placement in congested areas.

SUMMARY OF THE INVENTION

The invention provides a system and method for management of parking spaces that overcomes the hereinaforementioned disadvantages of the heretofore-known devices and methods of this general type that is configured to utilize the geolocation of a driver in need of a parking space within a certain radius from their current location in order to detect currently occupied parking spaces that will soon become vacant within the radius of the driver. In some embodiments, the system and method includes a server operating a centralized platform configured to notify motorists of occupied parking spaces that will soon be available and establish a secure connection between the mobile computing devices of the motorist and the current occupier of an occupied parking space selected by the motorist, wherein the system is configured to distribute incentives to the current occupier for preserving the occupied parking space until the motorist arrives. In some embodiments, the system utilizes machine learning techniques such as training a classification model using feature values used to predict whether an occupied parking space will come available soon and whether the current occupier is likely to wait for the motorist to arrive in order to receive an incentive.

With the foregoing and other objects in view, there is provided, in accordance with the invention, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for managing a parking space. The method also includes receiving, via a server, a geographic location of a first mobile computing device. The method also includes transmitting to the server, via the first mobile computing device, a query for an existing parking space within a defined proximity of the geographic location. The method also includes querying, via the server, a parking space database communicatively coupled to the server where the parking space database may include a plurality of active user parking data associated with a plurality of occupied parking spaces. The method also includes receiving, from a second mobile computing device, an indicator of an upcoming available parking space associated with at least one occupied parking space of the plurality of occupied parking spaces. The method also includes establishing, via the server, a connection between the first mobile computing device and the second mobile computing device based on the indicator. Other embodiments of this aspect include corresponding computer systems, apparatus, and computer programs recorded on one or more computer storage devices, each configured to perform the actions of the methods.

In accordance with another feature, an embodiment of the present invention includes a system for managing a parking space. The system also includes a first mobile computing device and a second mobile computing device. The system also includes a server designed and configured to: The system also includes receive a query for an existing parking space from the first mobile computing device within a predefined proximity of the geographic location of the first mobile computing device. The system also includes query a parking space database communicatively coupled to the server where the parking space database may include a plurality of active user parking data associated with a plurality of occupied parking spaces. The system also includes receive, from the second mobile computing device, an indicator of an upcoming available parking space associated with at least one occupied parking space of the plurality of occupied parking spaces. The system also includes establish a connection between the first mobile computing device and the second mobile computing device based on the indicator. Other embodiments of this aspect include corresponding computer systems, apparatus, and computer programs recorded on one or more computer storage devices, each configured to perform the actions of the methods.

In accordance with a further feature of the present invention, a system where the server is further configured to: generate a continually updating map may include the plurality of occupied parking spaces based on the geographic location of the first mobile computing device. Implementations of the described techniques may include hardware, a method or process, or computer software on a computer-accessible medium.

Although the invention is illustrated and described herein as embodied in a system and method for managing parking spaces, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method for managing parking spaces. Embodiments of the invention provide a server configured to provide a centralized platform for motorists to search for and obtain parking spaces based on determining the geolocation of a motorist subscribing to the platform and generating a continually updating map including occupied parking spaces currently occupied by a user subscribed to the platform in which if the motorist selects an occupied parking space occupied by the occupier, a secure connection is established between the mobile computing devices of the two users for a predetermined period of time based on the proximity of the motorist to the occupied parking space. Once the motorist selects an occupied parking space and the connection is established with the occupier, the occupier is extended an opportunity to receive an incentive for occupying the occupied parking space until the motorist arrives. Embodiments of the invention provide a server configured to utilize machine learning techniques in order to generate predictions of soon available occupied parking spaces and whether the current occupier is likely to occupy the parking space until the motorist arrives. The systems and methods described herein provide improvements to aggregation and processing of data associated with parking spaces in real time along with enhanced efficient presentation of soon to be available parking spaces on digital interactive maps generated based on the geolocation of the motorist. By automated and scalable processing of parking space data via a centralized platform in real time, the processing cost over network, computation, and storage is reduced in a manner that simultaneously not only maximizes the performance of data processing, but also improves the lives of motorist via generating ascertainable parking spaces in locations such as congested metropolitan areas.

Figure 1:
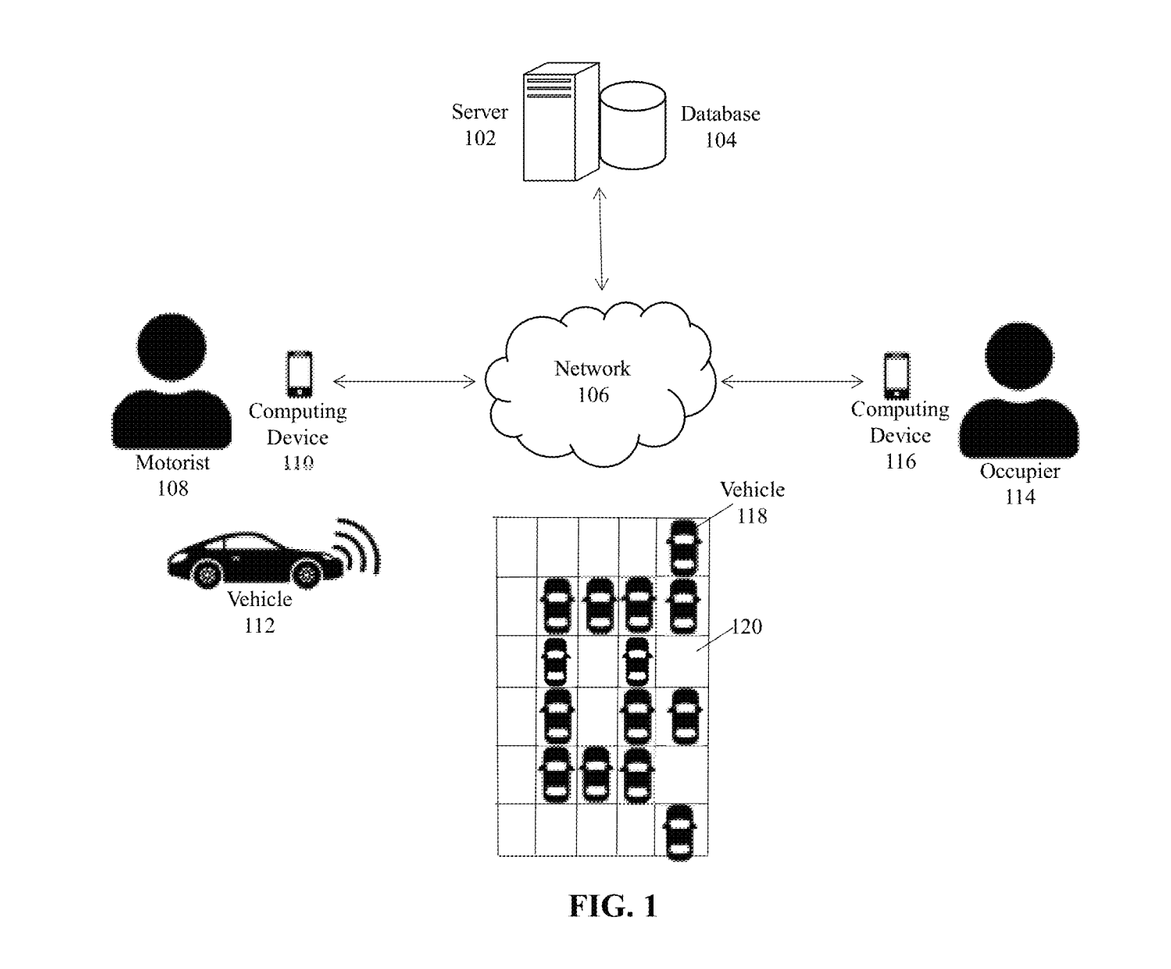
FIG. 1 is an overview of an example system for managing parking spaces, according to an example embodiment.

Referring now to FIG. 1, a system for managing parking spaces 100 is depicted, according to an exemplary embodiment. In one embodiment, system 100 includes a server 102 coupled to a parking space database 104, a communicative network 106, a motorist 108 operating over a motorist mobile computing device 110 configured to be associated with a motorist vehicle 112, an occupier 114 operating over an occupier computing device 116 configured to be associated with at least an occupier vehicle 118 of a plurality of occupier vehicles configured to occupy an occupied parking space 120 of a plurality of occupied parking spaces, each of the aforementioned components communicatively coupled via network 106. It will be understood by those skilled in the art that server 102 is designed to deploy a centralized platform, manifested via an installable or downloadable software, configured to transmit and receive a plurality of active user parking data over network 106, in which network 106 may be implemented as a Local Area Network (LAN), Wide Area Network (WAN), mobile communication network (GSM, GPRS, CDMA, MOBITEX, EDGE), Ethernet or the Internet, one or more terrestrial, satellite or wireless links, or any medium or mechanism that provides for the exchange of data between the aforementioned components of system 100. Examples of computing devices include a laptop computer, a tablet computer, a smartphone, a desktop computer, a Personal Digital Assistant (PDA), and any other mechanism including a processor used to access the internet or on which application programs can be run. System 100 illustrates only one of many possible arrangements of components configured to perform the functionality described herein. Other arrangements may include fewer or different components, and the division of work between the components may vary depending on the arrangement.

Server 102 may be implemented in hardware, software, or a combination of hardware and software. In one embodiment, server 102 is a cloud server configured to support an Internet-of-Things (IOT) infrastructure wherein mobile computing devices 110 and 116, a processor associated with vehicles 112 and 118, and any other applicable component of system 100 may be IOT devices configured to update in real time and continually provide the plurality of active user parking data and the geolocation of the respective device. For example, system 100 in the IOT configuration is configured to support components such as efficient storage within database 104, semantic integration, and parallel processing via server 102 allowing computing tasks such as processing of the plurality of active user parking data and generation of live maps including the plurality of occupied parking spaces configured to be accessible to motorist 108. In addition, system 100 may support micro-segmentation in which security policies are applied to individual workloads associated with network 106 for more effective security of the plurality of active user parking data and transmission of the plurality of active user parking data across network 106. Furthermore, server 102 in combination with database 104 is configured to query, retrieve, and present the plurality of active user parking data in a manner that limits the workload for network 106 which is used to establish the connection between server 102 and any applicable computing device of 100 in addition to host the secure connection between motorist mobile computing device 110 and occupier mobile computing device 116. It is to be understood that the centralized platform is configured to allow motorist 108 and occupier 114 (referred to collectively as the "users") to perform requests for and generate listings of occupied parking spaces, along with vacant and temporarily reserved parking spaces. It is to be understood that the parking space in which motorist 108 is configured to select is deemed a nascent parking space, wherein the plurality of occupied parking spaces are configured to be considered nascent. Motorists and occupiers, as provided in this disclosure, may be any operator of a vehicle including, but not limited to cars, bicycles, motorcycles, scooters (electric and non-electric), or any other applicable mobile object configured to transport.

In one embodiment, the centralized platform provided by server 102 is configured to be downloaded and/or integrated into one or more systems associated with vehicles 112 and 118 wherein a component of vehicles 112 and 118, such as a vehicle computer including a user interface and signal transmission capabilities is configured to communicatively couple vehicles 112 and 118 via the secure connection over network 106. In other words, motorist mobile computing device 110 and occupier mobile computing device 116 are configured to be integrated and/or associated with motorist vehicle 112 and occupier vehicle 116 allowing locations, conditions, and any other applicable data associated with a vehicle ascertainable by one of ordinary skill in the art to be distributed over network 106 in a secure and privatized manner. For example, respective processors associated with vehicles 112 and 118 are configured to communicate with each other in order for server 102 to establish one or more communicative connections that allow communicatively coupling between motorist mobile computing device 110 and occupier mobile computing device 116 over network 106, and/or motorist vehicle 112 and occupier vehicle 118 over network 106. In one embodiment, server 102 may determine based on the secure connection that occupied parking space 120 has been successfully transferred from occupier 114 to motorist 108 via server 102 detecting motorist vehicle 112 coming within a predetermined distance of occupier vehicle 118. For example, the predetermined distance between the two vehicles may be 10 feet, and server 102 may perform the detection based on one or more real-time locating systems allocated among motorist vehicle 112 and occupier vehicle 118 coming into contact with each other, such as but not limited to rfid, beacons, or any other applicable form of communication mechanisms for detection between two items.

Database 104 is configured to receive queries from server 102 generated by motorist mobile computing device 110 and/or occupier mobile computing device 116, wherein database 104 is configured to house a motorist record associated with motorist 108 including profile data and preferences of motorist 108, an occupier record associated with occupier 114 including profile data and preferences of occupier 114, and one or more active user parking data records configured to be utilized by server 102 in order to filter the results of occupied parking spots configured to have availability to be occupied by motorist 108 within a predetermined time period established by server 102 on the knowledge of the estimated time of arrival of motorist 108 to each of the plurality of occupied parking spaces, or the predicted transit time to the nascent parking space. Server 102 may determine the predetermined time period based on the geolocation of motorist mobile computing device 110 respective to occupied parking space 120. Server 102 is further configured to perform automated semantic integration on database 104 allowing metadata and data extracted from the plurality of active user parking data to be utilized in a manner that reduces redundancy in data being continually collected within system 100 and also allowing information extraction to be performed efficiently from various sources to output the optimal parking space options to motorist 108 in real time. It is to be understood that a user of system 100 may be both motorist 108 and occupier 114 subject to the circumstances; however, the user may not engage in a connection between computing device 110 and computing device 116 where the user is both motorist 108 and occupier 114 due to the fact that a motorist should not be able to occupy more than one occupied parking space 120 at a given time. It is to be understood that the connection is a data flow connection configured to utilize handover mechanisms and other mechanisms known to those of ordinary skill in the art allowing server 102 to maintain a non-continuous connection between the two computing devices, wherein the predetermined period of time may be based on multiple factors such as transit time of motorist 108 to nascent parking space. Server 102 may assist or not assist altogether the telecommunication link between the two computing devices; however, the data flow connection may be hosted and maintained by one or more telecommunication modules within or outside of system 100. In one embodiment, server 102, in combination with the one or more telecommunication modules or alone, is configured to mask or privatize the personal data of motorist 108 and occupier 114 allowing both parties to have redacted or masked components of personal data so that only essential data necessary for completing the transition of occupied parking space 120 to motorist 108 is made available during the connection.

Server 102 may receive various sets of data from one or more sensors associated with vehicles 112 and 118 (or the respective mobile computing devices), wherein applicable types of data received by server 102 may include, but is not limited to, GPS-based location data, satellite based location data, telematics, image data, video data, or any other applicable form of sensor data. As described in this disclosure, active user parking data includes but is not limited to payment information (banking information, mobile payment information, digital currency information), digital wallet information, vehicle type (VIN number), geographic location associated with mobile computing device and/or vehicle, a history or average of holdover occupancy time of occupier 114, early departure from the nascent parking space by occupier 114, how often does occupier 114 holdover the nascent parking space, license plate, incentive or currency information specific to system 100, preferences of users, areas frequented by users, a time period occupied parking space 120 will be nascent, and any other applicable information configured to assist users in finding the optimal parking space.

Figure 3:
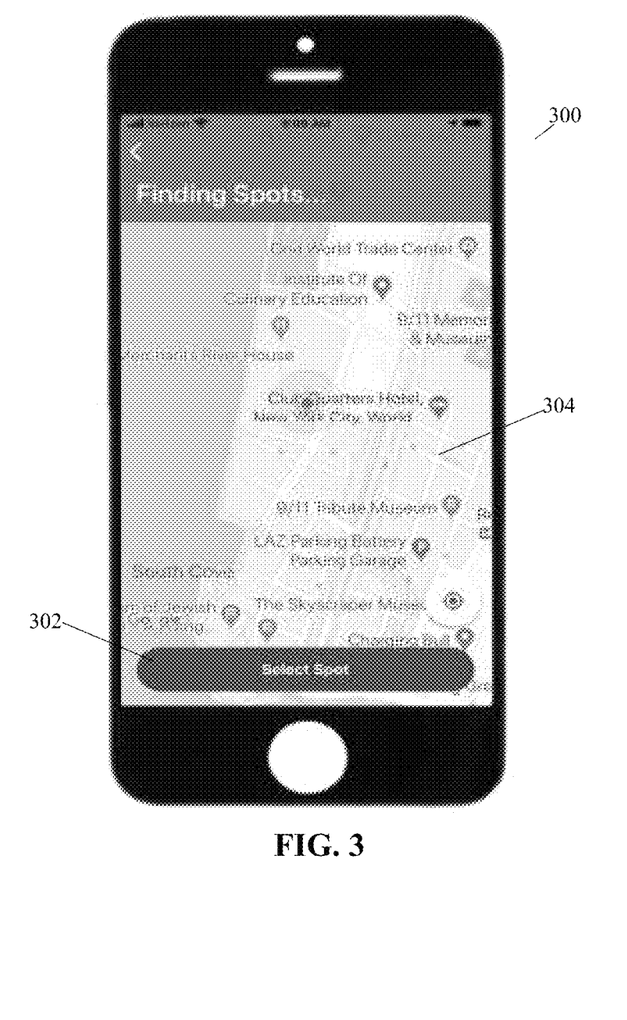
FIG. 3 is an exemplary virtual interactive map user interface depicted on the computing device utilized by the system for managing parking spaces, according to an example embodiment.

It is to be understood that server 102 is configured to generate a virtual interactive map, described in greater detail in reference to FIG. 3, based on the plurality of active user parking data configured to not only actively depict the geographic location of vehicle 112 in respect to the surroundings of vehicle 112, but also depict the plurality of occupied parking spaces that are configured to include occupied parking space 120 within proximity of motorist mobile computing device 110. In one embodiment, server 102 is configured to communicate with one or more GPS stations or satellites in order to actively receive geographic location data associated with motorist computing device 110, vehicle 112, and/or occupier mobile computing device 110 and occupier vehicle 118. Server 102 is further configured to communicate with the one or more GPS stations or satellites in order to actively receive geographic location data associated with occupier vehicle 118 in real time, transmitted from occupier mobile computing device 116 and/or occupier vehicle 118, in which server 102 may utilize the aforementioned data in order to generate a visual depiction of the geolocation of occupied parking spot 120 and occupier vehicle 118 in respect to motorist vehicle 112. Server 102 may utilize a geographic information system (GIS) configured to capture and analyze spatial and geographic data in order to generate an accurate representation of the locations and surroundings of motorist vehicle 112. In one embodiment, server 102 is configured to utilize the GIS, GPS, GNSS, or any other applicable autonomous geo-spatial positioning system in order to determine a radius from motorist vehicle 112 to the surrounding area that includes the plurality of occupied parking spaces based on the predetermined distance established by server 102. For example, the virtual interactive map may only depict the plurality of occupied parking spaces within a 10 block radius of motorist vehicle 112 in order to ensure that only applicable occupied parking spaces in which motorist 108 can arrive to within a reasonable amount of time are depicted on the virtual interactive map.

Figure 2:
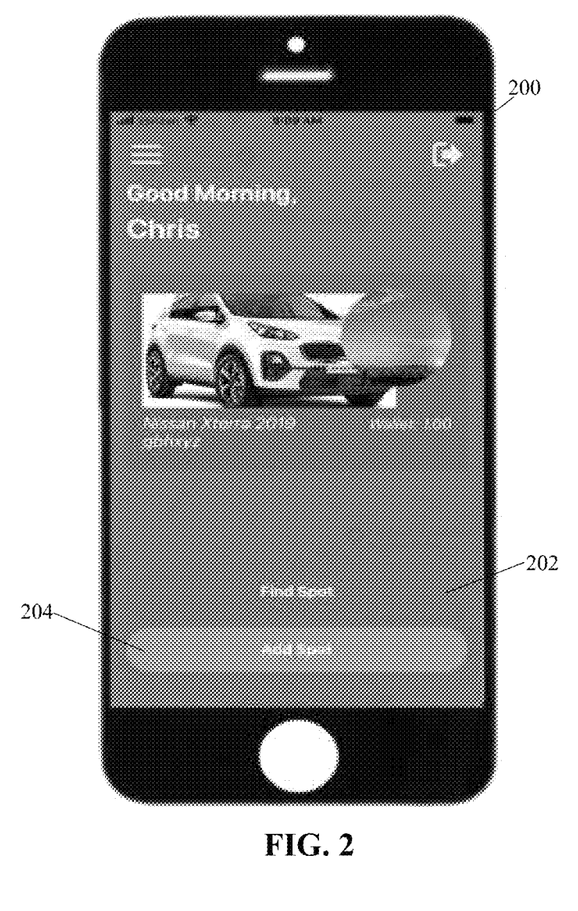
FIG. 2 is a first exemplary user profile user interface depicted on a computing device utilized by the system for managing parking spaces, according to an example embodiment.

Referring now to FIG. 2, a first user profile user interface 200 of system 100 is depicted on a computing device, according to an example embodiment. In one embodiment, first user profile user interface 200 includes a parking space finding mechanism 202 and a parking space contribution mechanism 204. It is to be understood that the purpose of the user is determined by selection of parking space finding mechanism 202 or parking space contribution mechanism 204, wherein selection of parking space finding mechanism 202 indicates the user is searching for a parking space and server 102 classifies the user as a motorist and selection of parking space contribution mechanism 204 classifies the user as a occupier who is occupying at least one of the plurality of parking spaces and is in the process or about to begin the process of releasing occupied parking space 120. As depicted in FIG. 2, first user profile user interface 200 presents a subset of the plurality of active user parking data, such as a profile picture of the user, a picture of the applicable vehicle, the applicable license plate number, and the remaining amount of the user's digital currency maintained in a digital wallet specific to a user associated with system 100. In one embodiment, users are able to register more than one vehicle on system 100 in which each separate vehicle may have a record stored on database 104 associated with the user; however, system 100 is configured to allow only one vehicle of the user to be utilized at a given time in order to ensure that users are not occupying multiple parking spaces at once. Parking space finding mechanism 202, or selection thereof by users, is configured to trigger server 102 to communicate with the GIS or any other applicable geo-spatial positioning system in order to discover parking spaces occupied by users of system 100 within the server allocated distance from motorist mobile computing device 110 and/or motorist vehicle 112. In one embodiment, once user selects parking space finding mechanism 202, server 102 simultaneously triggers motorist mobile computing device 110 and/or motorist vehicle 112 to transmit/receive signals from an applicable source, such as a radio navigation system, to triangulate the current location of motorist mobile computing device 110 and/or motorist vehicle 112 wherein server 102 is further configured to interact with an assisted global positioning system in order to assist geolocation while dismissing obstructions such as building, landmarks, etc. Server 102 is configured to continually receive data from motorist mobile computing device 110 and feed said data to an applicable GPS receiver in order to efficiently track the geolocation of motorist mobile computing device 110 without requiring significant computing resources of mobile computing device 110 that drain the power source. In one embodiment, once user selects parking space contribution mechanism 204, server 102 is triggered to interact with the geo-spatial positioning system in order to receive the geolocation of both occupier mobile computing device 116 and occupier vehicle 118. In one embodiment, server 102 is configured to transmit notifications to motorist mobile computing device 110 alerting motorist 108 of one or more statuses associated with occupier 114. For example, motorist 108 may receive notifications relating to whether occupier 114 is currently or about to relinquish occupied parking space 120, such as "Occupier has indicated parking space will be available in 20 minutes", "Occupier has left occupied parking spot", or any other applicable transmission to indicate the status of occupier 114 in relation to occupied parking space 120 to motorist 108.

Referring now to FIG. 3, a virtual interactive map user interface 300 of system 100 is depicted, according to an example embodiment. In one embodiment, virtual interactive map user interface 300 includes a parking space selection mechanism 302 and an interactive map 304, wherein selection of parking space selection mechanism 302 triggers server 102 to provide the plurality of occupied spaces available within the predetermined distance from motorist mobile computing device 110. In one embodiment, interactive map 304 includes the plurality of occupied parking spaces in addition to vacant and reserved parking spaces if applicable; however, it is to be understood that the primary function of system 100 is to allow an occupier to possess occupied parking space 120 until motorist 108 arrives at the location of occupied parking space 120. It also to be understood that the predetermined time associated with server 102 sustaining an established connection between motorist 108 and occupier 114 is based upon server 102 determining whether motorist 108 will arrive to occupied parking space 120 within a designated or allocated period of time. However, it is within the spirit and scope of the disclosure to provide an incentive to occupier 114 respective to the amount of time that occupier 114 must wait for motorist 108 to arrive to occupied parking space 120, and secure connection will terminate if transfer of occupied parking space 120 is not performed within the predetermined time period. In other words, the longer the wait the larger the incentive received by occupier 114. In one embodiment, the incentive is processed via server 102 wherein the incentive is transmitted by motorist mobile computing device 110 to server 102 wherein server 102 is configured to manage one or more digital wallets associated with the incentives for each user and distribute a portion of the incentives to occupier mobile computing device 116 upon switching possession of occupied parking space 120 to motorist 108 allowing server 102 to retain the remainder of the incentives. It is to be understood that incentives are configured to be transmitted and received by all users of system 100, and the mechanisms and methods utilized to perform the aforementioned are subject to the applicable configuration.

Figure 4:
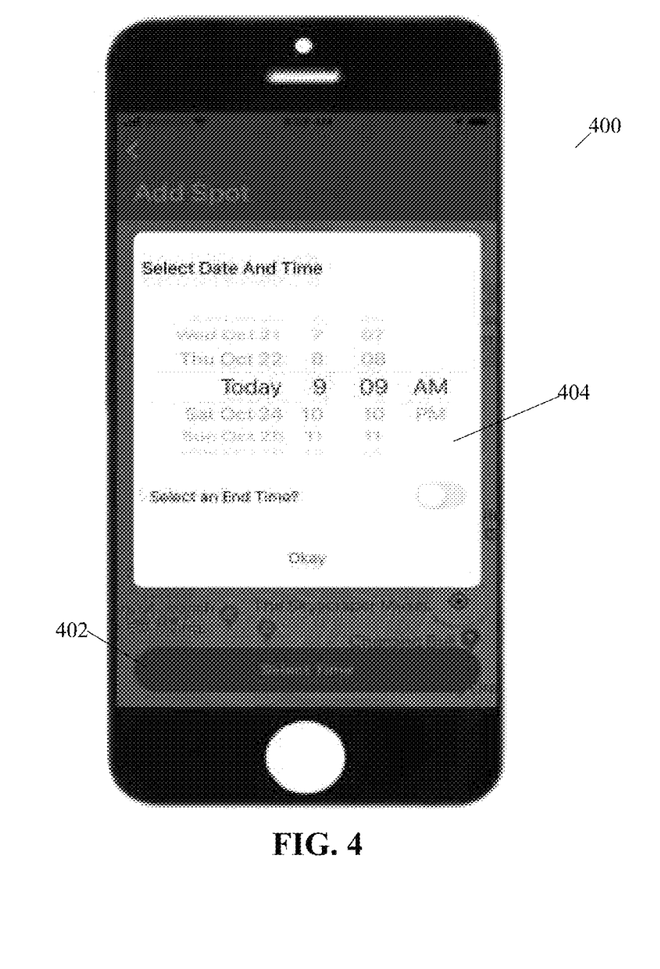
FIG. 4 is an exemplary preference option user interface depicted on the computing device utilized by the system for managing parking spaces, according to an example embodiment.

Referring now to FIG. 4, a preference option user interface 400 of system 100 is depicted on a computing device, according to an example embodiment. In one embodiment, server 102 is configured to utilize one or more algorithms to coordinate date, time, location, and any other applicable factor between motorist 108 and occupier 114, or motorist 108 may utilize preference option user interface 400 to schedule a request for a parking space that utilizes the one or more algorithms to schedule the request in advance. In one embodiment, server 102 provides preference option user interface 400 to motorist 108 and/or occupier 114 to enter preferences regarding desired location/area of town, time expected to arrive, and time expected to relinquish occupied parking space 120, wherein server 102 is configured to filter the plurality of parking spaces based on the provided preferences and updates interactive map 304 based on the provided preferences. For example, motorist 108 may provide an indicator via the preferences that he/she wished to have a parking space in Chelsea at approximately 8 pm, in which server 102 will query parking space database 104 for any occupier 114 that will be occupying occupied parking space 120 in Chelsea and will terminate possession of occupied parking space 120 within that time frame. In another example, occupier 114 may provide the indicator via the preferences to indicate that occupied parking space 120 will be available at a certain time, and occupied parking space 120 may not be available to be selected by motorist 108 on virtual interactive map user interface 300 until said preferences are received by server 102. In one embodiment, occupier 114 may provide an indicator that occupied parking space 120 is about to be available in which server 102 updates interactive map 304 and notifies motorist 108 of the upcoming availability of occupied parking space 120 based on the indicator, wherein this is configured to be performed in real-time.

Figure 5:
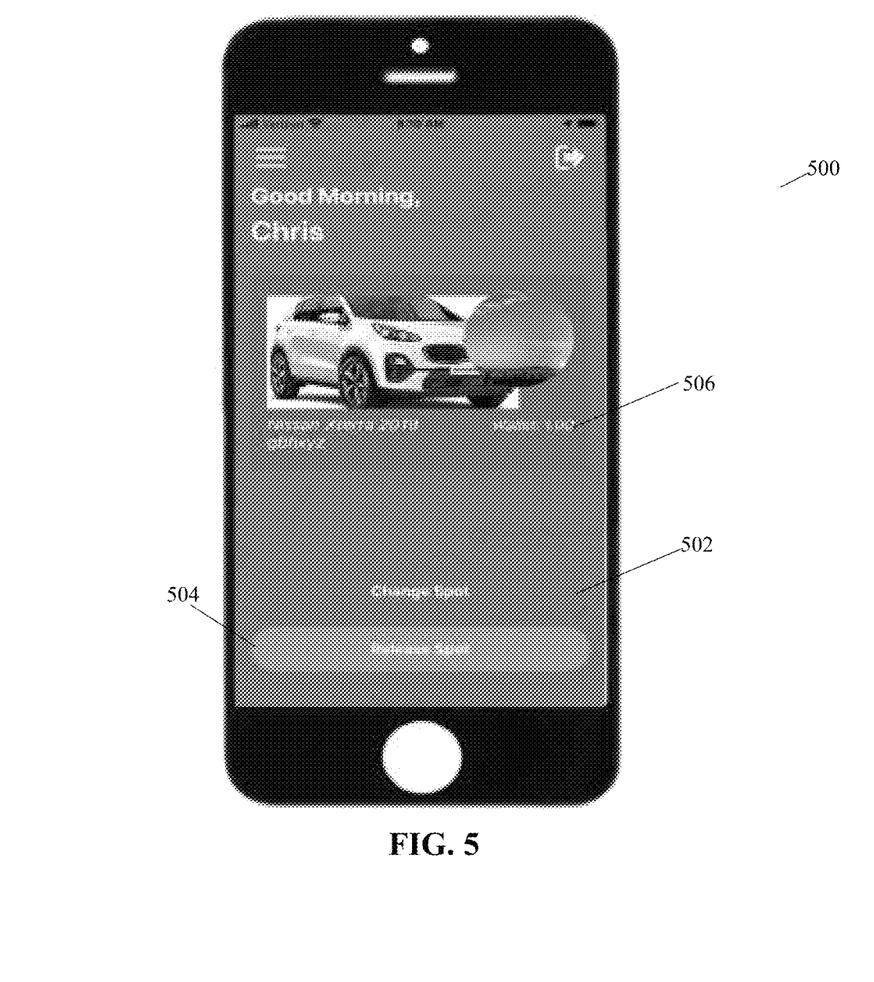
FIG. 5 is a second exemplary user profile user interface depicted on the computing device utilized by the system for managing parking spaces, according to an example embodiment.

Referring now to FIG. 5, a second user profile user interface 500 of system 100 is depicted a computing device, according to an example embodiment. In one embodiment, second user profile user interface 500 includes a change parking space mechanism 502 and a release/relinquish space mechanism 504 configured to be selected by occupier 114. In one embodiment, change parking space mechanism 502 is configured to allow occupier 114 to update the location of occupied parking space 120 in real time on virtual interactive map user interface 300. In one embodiment, selection of release/relinquish space mechanism 504 allows occupier 114 to "release" occupied parking space 120 to system 100 by trigger server 102 to include occupied parking space 120 in virtual interactive map user interface 300 for possible selection by motorist 108. In one embodiment, selection of release/relinquish space mechanism 504 triggers server 102 to generate the indicator that occupied parking space 120 will be available soon and may trigger server 102 to list occupied parking space 120 as "Available soon" on virtual interactive map user interface 300. In one embodiment, server 102 may be configured to provide motorist mobile computing device 110 with a preview of a digital currency 506 (amount in a user's digital wallet) which represents the amount that occupier 114 will be compensated by motorist 108 and/or system 100 to occupier 114 for relinquishing occupied parking space 120 and continuing to occupy occupied parking space 120 until motorist 108 has arrived within the predetermined distance of occupied parking space 120. It is to be understood that it is improbable and impractical for two vehicles to occupy a parking space at once; thus, it is within the spirit and scope of the invention to ensure that transferring of occupied parking space 120 from occupier 114 is performed in real time and may be based on server 102 efficiently establishing the secure connection between motorist mobile computing device 110 and occupier mobile computing device 116 in order to coordinate the transition of occupied parking space 120 to motorist 108. It is to be understood that the transition of occupied parking space 120 from occupier 114 to motorist 108 may be subject to the predetermined period of time; however, the transition is configured to ensure that another motorist does not occupy occupied parking space 120 while motorist 108 is en route. In some embodiments, any of the aforementioned mobile computing devices and/or vehicles are configured to include one or more alerting mechanisms configured to alert other motorists not associated with the secure connection that motorist 108 and occupier 114 are involved in the secure connection. Examples of the alerting mechanisms may be flashing, ringing, or any other applicable notifying mechanisms allocated to the aforementioned computing devices, vehicles, and/or affixable apparatuses configured to notify other motorists that the transition is taking place and that motorist 108 and occupier 114 are participating in the connection.

Figure 6:
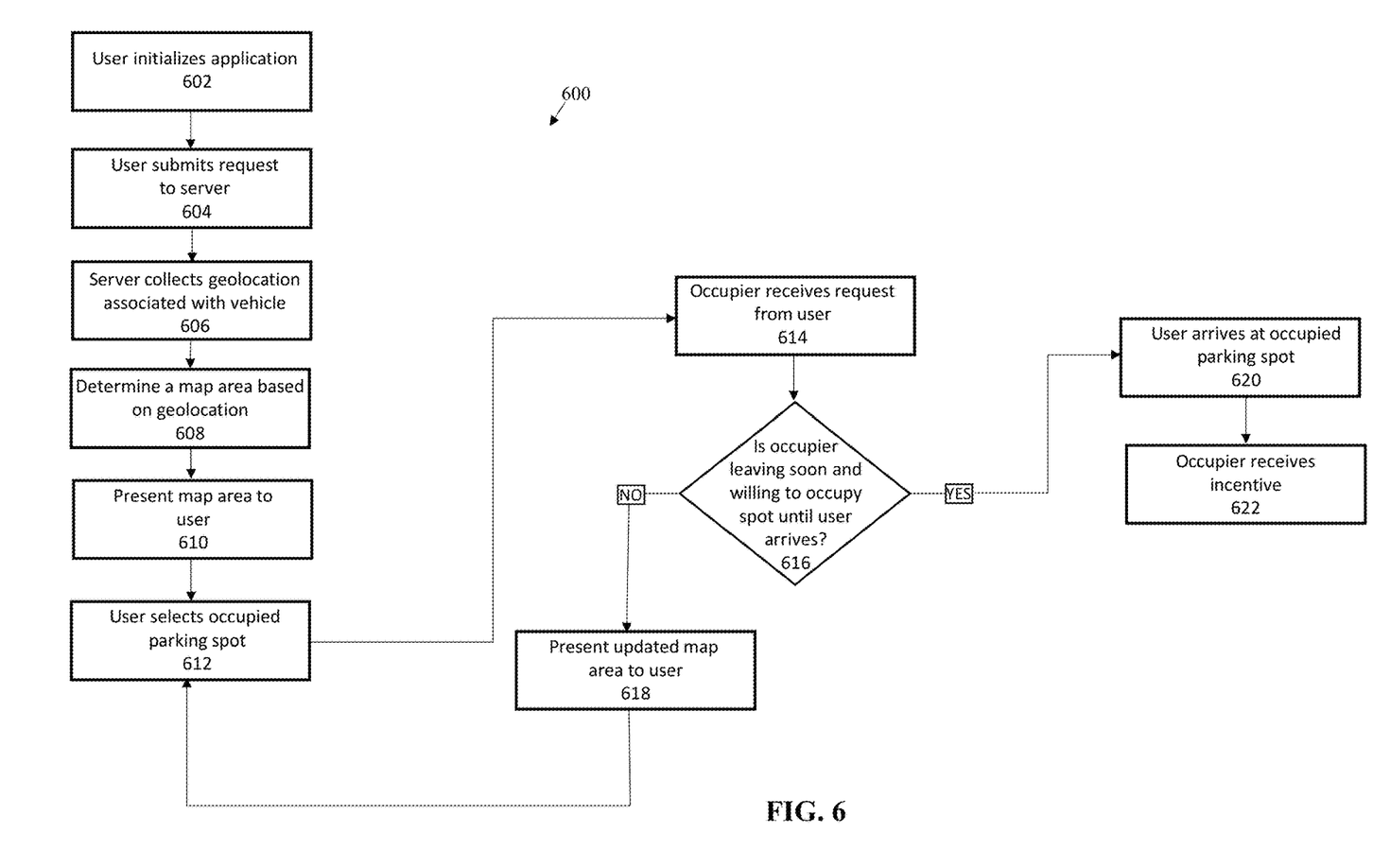
FIG. 6 is block diagram depicting a first method of managing parking spaces, according to an example embodiment.

Referring now to FIG. 6, a first block diagram depicting a first exemplary method for managing parking spaces 600 is depicted, according to an example embodiment. At step 602, users initialize system 100 by logging into system 100 via an entry graphical user interface. In one embodiment, the centralized platform associated with system 100 is configured to be downloadable software from the App Store, Google Play, or any other applicable digital distribution service known to those of ordinary skill in the art. The software versions of the centralized platform are configured to be scalable and non-specific to the classification of user; otherwise, motorist 108 and occupier 114 may utilize the same version of the platform allowing users to operate as both entities but never in the same transaction/session. At step 604, motorist 108 submits a request for a parking space via utilizing parking space finding mechanism 202, as illustrated in FIG. 2, prompting server 102 to initialize the process of collecting data and metadata from motorist mobile computing device 110 and/or motorist vehicle 112. It is possible for occupied parking space 120 to be visible on map 330 once occupied parking space 120 is released via release/relinquish space mechanism 504 by occupier 114. At step 606, server 102 collects the geolocation of motorist vehicle 112 via the geographic information system receiving signals from motorist mobile computing device 110 and/or motorist vehicle 112 in a manner in which server 102 utilizes parallel processing in order to analyze the plurality of active user parking data consistently being collected from motorist mobile computing device 110 and/or occupier mobile computing device 116. In other words, server 102 utilizes parallel processing in order to determine if occupier 114 is about to relinquish occupied parking space 120 and assigns occupied parking space 120 to the plurality of occupied parking spaces based upon said determination. It is to be understood that server 102 is actively utilizing the plurality of active user parking data collected from motorist mobile computing device 110 and/or occupier mobile computing device 116 in order to determine if a parking space should be included in the plurality of occupied parking spaces. At step 608, server 102 determines a map area based on the geolocation of mobile computing device 110 and/or motorist vehicle 112 coordinating with the geographic information system to define a designated area for the plurality of occupied parking spaces to be allocated. For example, server 102 may utilize the plurality of active user parking data in addition to the geolocation data, and user preferences if applicable, to define an area range for the plurality of parking spaces to be allocated based on the position of motorist mobile computing device 110 and/or motorist vehicle 112. For example, server 102 may default to collecting and presenting the plurality of occupied parking spaces within a 5-mile radius of motorist mobile computing device 110 and/or motorist vehicle 112. At step 610, server 102 presents virtual interactive map user interface 300 to motorist mobile computing device 110 providing motorist 108 the opportunity to view and select one of the plurality of occupied parking spaces. At step 612, motorist 108 selects occupied parking space 120 of the plurality of occupied spaces. In one embodiment, upon occupied parking space 120 being selected, server 102 establishes the secure connection between the two parties and server 102 allocates the predetermined time period to arrive at occupied parking space 120 based on the distance between the two parties. At step 614, server 102 notifies occupier mobile computing device 116 that motorist 108 has requested occupied parking space 120. It is to be understood that the indicator transmitted by occupier computing device 116 that occupied parking space 120 will soon be available may be generated by occupier 114 explicitly indicating, via selection of parking space contribution mechanism 204 and/or release/relinquish space mechanism 504, that occupied parking space 120 will be available soon or server 102 may be configured to automatically determine that occupied parking space 120 will be available shortly based on one or more relevant factors. For example, server 102 may be configured to utilize a timer mechanism specific to occupied parking space 120 wherein incremental periods of the timer mechanism (30 minutes until expiration) or indicators that occupier 114 will not or cannot extend the parking time for occupied parking space 120 allows server 102 to trigger the notification for occupied parking space 120 becoming available in the near future. At step 616, once occupier 114 is notified that occupied parking space 120 has been selected by motorist 108, server 108 provides occupier 114 with an opportunity to determine whether occupier 114 would be willing to continue to occupy occupied parking space 120 until motorist 108 is within a reasonable proximity of occupied parking space 120 in exchange for an incentive received by occupier computing device 116. As will be discussed in greater detail in relation to FIG. 7, server 102 may utilize one or more machine learning algorithms in order to generate predictions relating to the aforementioned decision of occupier 114. If occupier 114 indicates that he/she is not willing to continue to occupy occupied parking space 120 until motorist 108 arrives then step 618 occurs in which server 102 presents an updated version of virtual interactive map user interface 300 not including occupier 114 and/or flags occupied parking space 120 as "Subject to availability at arrival" allowing motorist 108 the opportunity to select another parking space. Otherwise, at step 620 motorist 108 arrives at occupied parking space 120 within the predetermined time. At step 622, occupier 114 receives an incentive from motorist 108, configured to be stored in the digital wallet associated occupier 114, for awaiting for the arrival of motorist 108 at occupied parking space 120, wherein a portion of the incentive may be retained by server 102. It is to be understood that an incentive may be currency, banknotes, coins, digital currency, cryptocurrency, virtual tokens, rewards/coupons/discounts, or any applicable financial incentive or payment. In one embodiment, system 100 may further include an incentive management system configured to organize incentives with digital wallets associated with users, and upon predetermined incentive threshold amounts being met, rewards, points, and other applicable incentives associated with entities outside of system 100 are distributed. Wherein outside entities may be commerce providers, credit card companies, retailers, and any other entities configured to utilize incentives.

Figure 7:
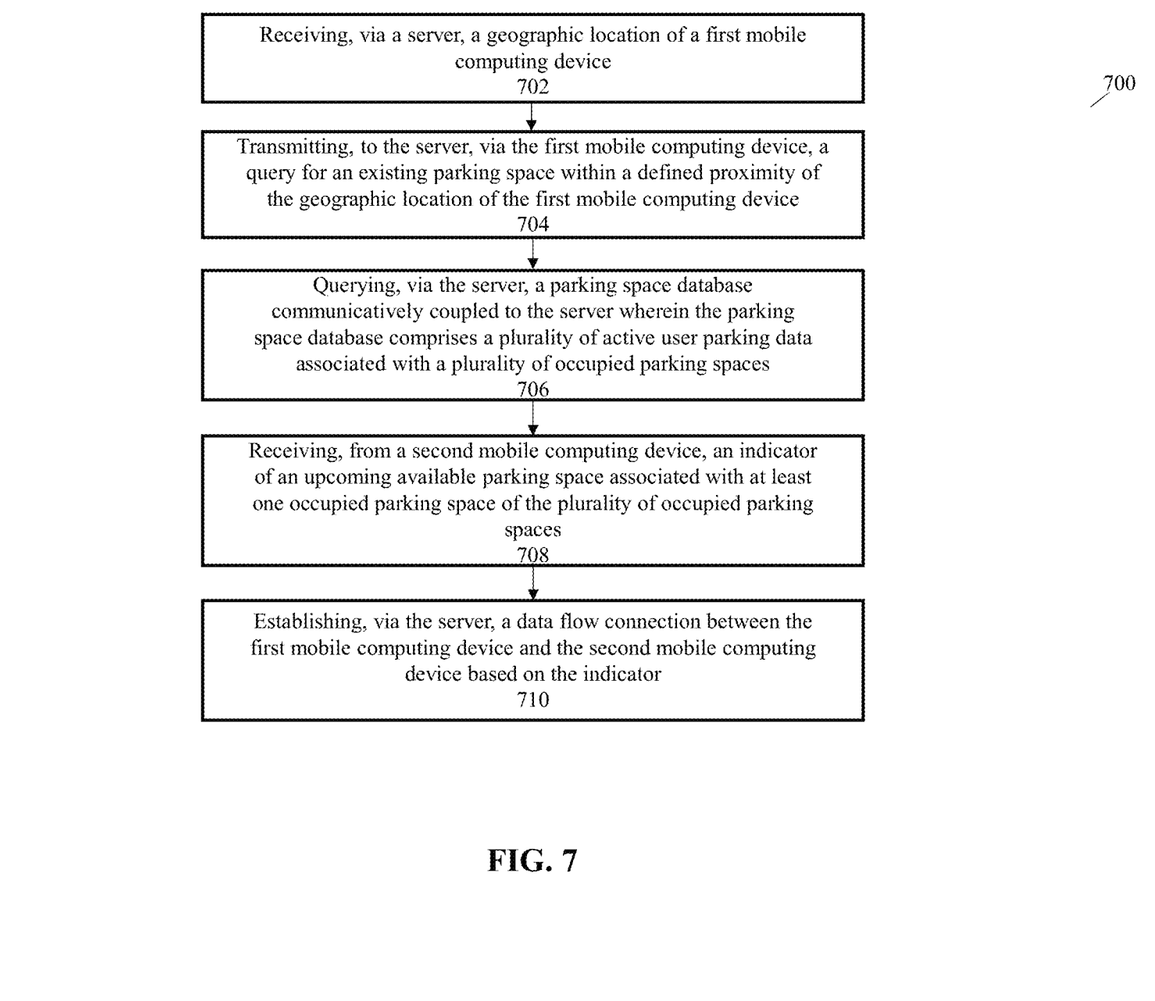
FIG. 7 is block diagram depicting a second method of managing parking spaces, according to an example embodiment.

Referring now to FIG. 7, a second block diagram depicting a second exemplary method for managing parking spaces 700 is depicted, according to an example embodiment. At step 702, server 102 receives a geographic location from motorist mobile computing device 110. It is to be understood that this initial data transmission from motorist computing device 110 to server 102 may include the geolocation and/or the plurality of active user parking data. At step 704, motorist mobile computing device 110 transmits a query for an existing parking space within a predefined proximity of the geolocation to server 102. It is to be understood that the extent and bounds of the predefined proximity may be determined by server 102 and/or based on preferences provided by motorist 108. At step 706, server 102 queries parking space database 104 in search of the plurality of occupied parking spaces that fall within the constraints of the plurality of active user parking data. At step 708, occupier 114 provides the indication that occupied parking space 120 will be available soon and is eligible for motorist 108 to subsequently occupy. At step 710, server 102 establishes a secured connection between motorist mobile computing device 110 and occupier mobile computing device 116 wherein the connection is configured to support communicative channels between motorist 108 and occupier 114 including, but not limited to, text communication, video conferencing, or any other applicable form of communication.

In one embodiment, server 102 may utilize a machine learning model or a rule-based model in order to generate predictions associated with the plurality of active user parking data and upcoming availability of occupied parking space 120. For example, if the model is a machine-learned model, then one or more machine learning techniques are used to "learn" weights of different features, which weights are then utilized by server 102 to generate one or more predictions associated with upcoming availability of occupied parking space 120 or presentation of available parking spots to motorist 108 subject to the aforementioned preferences of either party. The features, also known as feature values, associated with the weights include but are not limited to holdover occupancy time of occupier 114 of occupied parking space 120, early departure by occupier 114 from occupied parking space 120, how often does occupier 114 holdover occupied parking space 120, rate of acceptance of incentives by occupier 114, geolocational preferences of users, incentive utilization of users, date/time/location of user utilization of system 100, and any other applicable factor configured to assist motorist 108 is selecting the optimal parking space.

In one embodiment, server 102 is configured to generate a classification model generated based on training data utilizing the one or more aforementioned machine learning techniques, wherein the feature values are configured to be inserted into the classification model. Machine learning is the study and construction of algorithms that can learn from, and make predictions on, data. Such algorithms operate by building a model from inputs in order to make data-driven predictions or decisions. Thus, a machine learning technique is used to generate a statistical that is trained based on a history of attribute values associated with data utilized within system 100, such as the plurality of active user parking data, allowing a determination as to whether a particular occupied parking space of the plurality of occupied parking spaces is configured to be nascent. The machine-learned model is trained based on multiple attributes (or factors) described herein. In machine learning parlance, such attributes are referred to as "features". In an embodiment, various feature weights or coefficients are established in order to accurately generate predictions for system 100. To generate and train a machine-learned model, a set of features is specified and training data is generated, wherein the training data and instances of the training data correspond to the plurality of occupied parking spaces and predictions of the machine learning may be manifested in generated outputs occupancy status of an occupied parking space. Also, the training data is configured to be dynamically acquired over long periods of time. For example, a new machine-learned model is generated regularly, such as every hour, day, month, week, or other time period. Thus, the new machine-learned model may replace a previous machine-learned model. Newly acquired or changed training data may be used to update the model.

Figure 8:
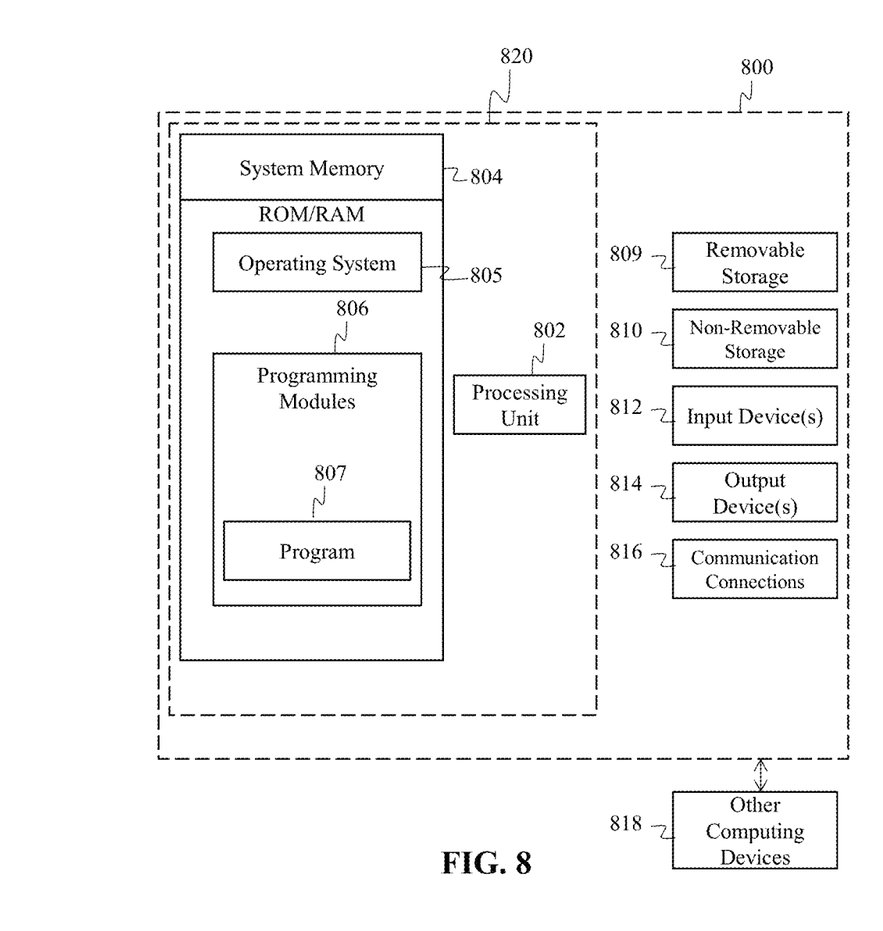
FIG. 8 is a block diagram that illustrates a computer system upon which an embodiment of the invention may be implemented

FIG. 8 is a block diagram of a system including an example computing device 800 and other computing devices. Consistent with the embodiments described herein, the aforementioned actions performed by devices 110, 116, and server 102 may be implemented in a computing device, such as the computing device 800 of FIG. 8. Any suitable combination of hardware, software, or firmware may be used to implement the computing device 800. The aforementioned system, device, and processors are examples and other systems, devices, and processors may comprise the aforementioned computing device. Furthermore, computing device 800 may comprise an operating environment for system 100 and processes/methods 600 & 700. Processes 600 & 700, and data related to said processes may operate in other environments and are not limited to computing device 800.

With reference to FIG. 8, a system consistent with an embodiment of the invention may include a plurality of computing devices, such as computing device 800. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination or memory. System memory 804 may include operating system 805, and one or more programming modules 806. Operating system 805, for example, may be suitable for controlling computing device 800's operation. In one embodiment, programming modules 806 may include, for example, a program module 807 for executing the actions of server 102 and devices 110 and 116, for example. Furthermore, embodiments of the invention may be practiced in conjunction with a graphics library, other operating systems, or any other application program and is not limited to any particular application or system. This basic configuration is illustrated in FIG. 8 by those components within a dashed line 820.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and nonvolatile, removable and non-removable media implemented in any method or technology for storage of information, such as computer readable instructions, data structures, program modules, or other data. System memory 804, removable storage 809, and non-removable storage 810 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 66 such as a keyboard, a mouse, a pen, a sound input device, a camera, a touch input device, etc. Output device(s) 814 such as a display, speakers, a printer, etc. may also be included. The aforementioned devices are only examples, and other devices may be added or substituted.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 804, including operating system 805. While executing on processing unit 802, programming modules 806 (e.g. program module 807) may perform processes including, for example, one or more of the stages of the processes 600 and 700 as described above. The aforementioned processes are examples, and processing unit 802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

What is claimed is:

1. A method for managing a parking space, comprising:
    receiving, via a server, a geographic location of a first mobile computing device;
    transmitting, to the server, via the first mobile computing device, a query for an existing parking space within a defined proximity of the geographic location;
    querying, via the server, a parking space database communicatively coupled to the server wherein the parking space database comprises a plurality of active user parking data associated with a plurality of occupied parking spaces;
    receiving, from a second mobile computing device, an indicator of an upcoming available parking space associated with at least one occupied parking space of the plurality of occupied parking spaces;
    establishing and hosting, via the server, a data flow connection between the first mobile computing device and the second mobile computing device based on the indicator, wherein the server is configured to maintain the data flow communication until the first mobile computing device is within a predefined proximity to the second mobile computing device, and the server is further configured to terminate the data flow communication if a predetermined period of time has passed in which the first mobile computing device has not come within the predefined proximity to the second mobile computing device; and
    upon determining, via the server, that the first mobile computing device is within the predefined proximity to the second mobile computing device within the predetermined period of time, and providing, via the server, an incentive to the second mobile computing device, wherein an amount of the incentive is determined by a duration of time that has passed between establishing the data flow and the first mobile communication device coming within the predetermined proximity distance of the second mobile communication device, and increases over the duration of time between establishing the data flow and the first mobile communication device coming within the predetermined proximity of the second mobile communication device.

2. He method of claim 1, further comprising:
privatizing, via the server, the connection between the first mobile computing device and the second mobile computing device based upon the first mobile computing device requesting the indicator.

3. The method claim 1, wherein first mobile computing device is associated with a first vehicle and second mobile computing device is associated with a second vehicle.

4. The method claim 3, wherein a predetermined period of time is determined based on proximity of the first vehicle to the second vehicle.

5. The method claim 1, wherein the plurality of active user parking data comprises at least one of payment information, contact information, vehicle type, vehicle size, license plate, or data of a nascent parking space.

6. The method of claim 1, further comprising:
identifying a plurality of feature values associated with a particular occupied parking space and the plurality of occupied parking spaces; and
determining whether the particular occupied parking space is configured to be vacant sooner than the plurality of occupied parking spaces.

7. The method of claim 6, further comprising:
storing training data that comprises a plurality of training instances, wherein each training instance in the plurality of training instances corresponds to the plurality of occupied parking spaces, and the training data includes the plurality of feature values pertaining to the plurality of occupied parking spaces; and
using one or more machine learning techniques to train a classification model based on the training data;
wherein the determination comprises inserting the plurality of feature values into the classification model that generates an output that is used to determine an occupancy status of an occupied parking space.

8. The method of claim 1, further comprising:
generating a continually updating map comprising the plurality of occupied parking spaces based on the geographic location of the first mobile computing device.

9. A system for managing a parking space, comprising:
a first mobile computing device and a second mobile computing device;
a server designed and configured to:
receive a query for an existing parking space from the first mobile computing device within a defined proximity of the geographic location of the first mobile computing device;
query a parking space database communicatively coupled to the server wherein the parking space database comprises a plurality of active user parking data associated with a plurality of occupied parking spaces;
receive, from the second mobile computing device, an indicator of an upcoming available parking space associated with at least one occupied parking space of the plurality of occupied parking spaces;
establish, at the server, a data flow connection between the first mobile computing device and the second mobile computing device based on the indicator, wherein the data flow communication persists until the first mobile computing device is within a predefined proximity to the second mobile computing device, within a predetermined period of time; and
provide, via the server, an incentive to the second mobile computing device, wherein an amount of the incentive is determined by a duration of time that has passed between establishing the data flow and the first mobile communication device coming within the predetermined proximity distance of the second mobile communication device, and increases over the duration of time between establishing the data flow and the first mobile communication device coming within the predetermined proximity of the second mobile communication device.

10. The system of claim 9, wherein the server is further configured to:
privatize the connection between the first mobile computing device and the second mobile computing device based upon the first mobile computing device requesting the indicator.

11. The system claim 9, wherein first mobile computing device is associated with a first vehicle and second mobile computing device is associated with a second vehicle.

12. The system claim 9, wherein a predetermined period of time is determined based on proximity of the first vehicle to the second vehicle.

13. The system claim 9, wherein the plurality of active user parking data comprises at least one of payment information, contact information, vehicle type, vehicle size, license plate, or data of a nascent parking space.

14. The system of claim 9, wherein the server is further configured to:
identify a plurality of feature values associated with a particular occupied parking space and the plurality of occupied parking spaces; and
determine whether the particular occupied parking space is configured to be vacant sooner than the plurality of occupied parking spaces.

15. The system of claim 14, wherein the server is further configured to:
store training data that comprises a plurality of training instances, wherein each training instance in the plurality of training instances corresponds to the plurality of occupied parking spaces, and the training data includes the plurality of feature values pertaining to the plurality of occupied parking spaces; and
utilize one or more machine learning techniques to train a classification model based on the training data;
wherein the determination comprises inserting the plurality of feature values into the classification model that generates an output that is used to determine an occupancy status of an occupied parking space.

16. The system of claim 9, wherein the server is further configured to:
generate a continually updating map comprising the plurality of occupied parking spaces based on the geographic location of the first mobile computing device.

* * * * *